United States Patent [19]

McDaniel et al.

[11] 4,295,997

[45] Oct. 20, 1981

[54] SO₂ ACTIVATION OF SUPPORTED CHROMIUM OXIDE CATALYSTS

[75] Inventors: Max P. McDaniel; Melvin B. Welch, both of Bartlesville, Okla.

[73] Assignee: Phillips Petroleum Company, Bartlesville, Okla.

[21] Appl. No.: 125,435

[22] Filed: Feb. 28, 1980

Related U.S. Application Data

[63] Continuation-in-part of Ser. No. 2,633, Jan. 11, 1979, abandoned.

[51] Int. Cl.³ .................... B01J 27/02; B01J 23/26; B01J 21/08
[52] U.S. Cl. .................................. 252/439; 252/458; 526/106
[58] Field of Search ................ 252/458, 439; 526/106

[56] References Cited

U.S. PATENT DOCUMENTS

| | | | |
|---|---|---|---|
| 3,037,008 | 5/1962 | Garetson et al. | 526/106 |
| 3,091,605 | 5/1963 | Hull et al. | 526/106 X |
| 3,362,946 | 1/1968 | Hogan | 252/458 X |
| 3,780,001 | 12/1973 | Pullukat et al. | 252/458 X |
| 4,177,162 | 12/1979 | McDaniel | 252/439 |

*Primary Examiner*—Carl F. Dees

[57] ABSTRACT

A method for producing activated catalysts in which a catalyst containing chromium on a silica-containing support is (1) contacted with a gaseous environment consisting essentially of sulfur dioxde and oxygen at a temperature in a range of about 450° C. to about 1100° C. for a time ranging from about one to about five hours and (2) subsequently maintaining a temperature within the contact temperature range while contacting the catalyst with a gaseous environment consisting essentially of oxygen and gases inert to reaction with the catalyst. In another embodiment of the invention the temperature for a succeeding step is not raised above that attained in the previous step. In an embodiment of the invention the catalyst is contacted with a gaseous environment consisting essentially of oxygen and gases inert to reaction with the catalyst while the temperature is being increased prior to contact with sulfur dioxide.

8 Claims, No Drawings

SO₂ ACTIVATION OF SUPPORTED CHROMIUM OXIDE CATALYSTS

BACKGROUND OF THE INVENTION

This is a continuation-in-part application of copending application Ser. No. 002,633, filed Jan. 11, 1979 now abandoned.

This invention relates to the activation of chromium-containing catalysts. In another of its aspects this invention relates to olefin polymerization catalysts. In another of its aspects this invention relates to the preparation of catalysts useful in producing polymers of ethylene.

It is well known to calcine supported chromium oxide catalysts in an oxygen-containing gas to produce an activated catalyst for ethylene polymerization. The activated catalysts are then used under suitable conditions to polymerize ethylene or ethylene admixed with a comonomer of a higher aliphatic 1-olefin containing up to about 10 carbon atoms to produce normally solid homopolymers or copolymers of ethylene. The resulting polymers can be converted into such useful articles as film, fibers, molded items, and the like by employing conventional plastics fabrication equipment such as extruders, thermoformers, injection molders, blow molders, and the like.

Although it has been conventional to exclude sulfur dioxide from the calcining process, it has now been discovered that a relatively modest increase of melt index potential is demonstrated by supported chromium oxide catalysts that are calcined in an environment comprising an oxygen-containing gas and sulfur dioxide as compared to catalysts that are calcined in an oxygen-containing gas in the absence of sulfur dioxide. The melt index of polymers made with catalysts calcined in the presence of both oxygen-containing gas and sulfur dioxide can range up to about double that of polymers made with untreated catalysts. This comparison is made with catalysts being activated at the same temperature.

It is therefore an object of this invention to provide a method for increasing the melt index potential of supported chromium oxide catalysts used in the preparation of ethylene polymers. It is another object of this invention to prepare an improved catalyst. It is still another object of this invention to prepare polymers of ethylene having increased melt index potential.

Other aspects, objects, and the various advantages of this invention will become apparent upon reading this specification and the appended claims.

STATEMENT OF THE INVENTION

According to this invention, a method is provided for producing an activated catalyst in which a catalyst of chromium on a silica-containing support is (1) contacted with a gaseous environment consisting essentially of sulfur dioxide and oxygen at a temperature within a temperature range and for a time sufficient to activate the catalyst and (2) subsequently maintaining a temperature within this contact temperature range while contacting the catalyst with a gaseous environment consisting essentially of oxygen and gases inert to reaction with the catalyst.

In various embodiments of the invention during the period in which the catalyst is being raised to the activation temperature range the catalyst is contacted with a gaseous environment consisting essentially of either sulfur dioxide and oxygen or oxygen and gases inert to reaction with the catalyst.

In another embodiment of the invention the temperature for a succeeding step is not raised above that attained in the previous step.

In another embodiment of the invention the catalysts produced as described above are contacted with ethylene or ethylene in the presence of other aliphatic 1-olefin containing up to about 10 carbon atoms to produce homopolymers and copolymers of ethylene.

The silica supports utilized in the catalyst of this invention consist entirely of silica and silica admixed with up to about 20 weight percent of another metal oxide selected from among alumina, boria, thoria, titania, and zirconia, and mixtures. Presently preferred supports consist of about 90-100 weight percent silica and 1-10 weight percent titania.

The amounts of chromium as chromium oxide associated with the support to produce the catalysts after calcination can range from about 0.1 to 10 weight percent or up to about 50 weight percent. Suitable chromium compounds used in producing the catalysts are any which produce chromium oxide upon calcination of the composite. Exemplary compounds include chromium acetate, chromium nitrate, chromium trioxide, chromium sulfate, chromium acetylacetonate, t-butyl chromate, dicumene chromium and the like.

A mole ratio of sulfur dioxide to oxygen is selected such that at least some free oxygen is present during catalyst activation. Generally, the mole ratio of $SO_2:O_2$ ranges from about 1:0.55 to 1:10 in the activation process.

For convenience, a preferred embodiment of the process can be separated into three steps. In step 1, the catalyst can be brought up to activation temperature within the desired range in an oxygen-containing environment, e.g., oxygen, oxygen diluted with an inert gas, air, and held at that temperature a suitable period of time, i.e., 1-10 hours. In step 2, while maintaining the temperature within the desired range the $SO_2/O_2$-containing contact gas employed is passed over the catalyst for the length of time required for treatment, i.e., 1-5 hours. In step 3, while maintaining any temperature or temperatures within the desired range, the catalyst is held in the environment employed in step 1 for a time period of about 0.1 to about 5 hours. As a practical matter, it is often quite convenient and practicable to maintain the same temperature in steps 2 and 3 (note the examples that follow). There is no requirement, however, that the same temperature be maintained. A different temperature or temperatures within the required range for steps 2 and 3 is sufficient to accomplish the objects of this invention. Since it has been discovered that the melt index capability of the activated catalyst can decrease for catalyst produced using temperatures elevated in steps 2 and 3 over that used in step 1 as compared to catalyst activated at the same or lower temperature for steps 2 and 3, it is presently preferred that the temperature of steps 2 or 3 does not exceed the highest temperature attained in step 1. Following the treatment, the temperature is reduced, the catalyst is recovered and is stored in a dry atmosphere until ready for use. Although less economical to do so, the catalysts can be brought up to temperature and held the desired period of time at that temperature in the $SO_2/O_2$ environment. It is preferred, however, to flush $SO_2$ from the treatment zone prior to recovering the treated catalyst to avoid any possibility of poisoning effects, corrosion effects, etc., during the subsequent polymerization process.

The activation temperatures employed in this invention can vary rather widely within a range of about 450° C. to 1100° C. (840° to 2000° F.) and more preferably from about 540° to about 900° C. (1000°–1650° F.). The total hold time the catalyst undergoes at the activation temperature can vary from about 2 to 20 hours as described previously. Generally, as the hold time increases for a given temperature, the melt index capability of the catalyst tends to increase somewhat until the sintering point of the silica support is reached, e.g., about 925° C. (1700° F.) for a substantially all-silica support, at that time a leveling off or even a small decline in melt index capability of the catalyst can occur.

The catalysts of this invention can be used in producing ethylene homopolymers and copolymers from mixtures with ethylene and one or more comonomers selected from 1-olefins containing up to 10 carbon atoms per molecule. Exemplary comonomers include aliphatic 1-olefins, such as propylene, 1-butene, 1-hexene, and the like. Ethylene copolymers preferably constitute at least about 90, more preferably 95 to 99, mole percent polymerized ethylene units.

The polymer can be prepared with the activated catalyst of this invention by solution polymerization, slurry polymerization, and gas phase polymerization techniques using conventional equipment and contacting processes. The catalysts of this invention are, however, particularly suitable for slurry polymerization for the production of high melt index (M.I.) polymers, i.e., polymers having M.I. values in the range of 1 to 10 and above in the absence of molecular weight modifiers, such as hydrogen, and molecular weight distribution values sufficiently narrow to be of commercial interest. Slurry processes are generally carried out in an inert diluent such as a paraffin, aromatic hydrocarbon or cycloparaffin. For predominantly ethylene polymers a temperature of about 66° C. to about 110° C. is employed in the polymerization.

EXAMPLE

A series of catalyst was prepared by calcining individual portions of a dry silica-titania-chromium oxide catalyst in the manner outlined below. The silica-titania support consisted of 97.5 weight percent titanium as silica and 2.5 weight percent titania prepared by coprecipitation as described in U.S. Pat. No. 3,887,494. It contained one weight percent chromium as chromium oxide based on the weight of the dry composite. Each catalyst portion amounting to about 50 mL (10 g) was activated in a fluidized lab-sized glass activator of 48 mm diameter using a gas flow of 40 L/hr for the indicated periods of time and indicated temperatures. A 350° C./hr temperature rise was employed in heating the activator. Catalyst 1: control, activated for five hours at 1200° F. (649° C.) in dry air. Catalyst 2: invention, catalyst was held for 1.5 hrs. in dry air at 1200° F., for one hour in a mixture consisting of 50/50 by volume dry sulfur dioxide and oxygen at 1200° F., and for one hour in dry air at 1200° F. Total hold time was 3.5 hours. Mole ratio of $SO_2/O_2$ was 1:1. Catalyst 3: control, activated for five hours at 1400° F. (760° C.) in dry air. Catalyst 4: invention, catalyst was held for two hours in dry air at 1400° F., for one hour at 1400° F. for the dry $SO_2/O_2$ mixture used for Catalyst 2 and for one hour at 1400° F. in dry air. Total hold time was four hours.

Each catalyst was employed in the particle form polymerization of ethylene in the presence of an isobutane diluent, a nominal pressure of 550 psi (3.8 MPa) and a reactor temperature of 230° F. (110° C.). The results are presented in Table I.

Melt index (MI) was determined in accordance with ASTM D 1238-65T, Condition E. High load melt index (HLMI) was determined in accordance with ASTM D 1238-65T, Condition F.

TABLE I

| | | | Ethylene Polymerization at 110¼C | | | |
|---|---|---|---|---|---|---|
| Catalyst No. | Wt., g | Polymer Yield, g | Calculated Productivity g/g Catalyst | Corrected[a] Melt Index | HLMI[b]/MI | Catalyst Activating Environment |
| 1 | 0.0393 | 218.0 | 5550 | 0.88 | 41 | air |
| 2 | 0.0416 | 218.5 | 5250 | 1.4 | 33 | $SO_2 + O_2$ |
| 3 | 0.0391 | 188.5 | 4820 | 3.0 | 34 | air |
| 4 | 0.0425 | 219.0 | 5150 | 4.1 | 37 | $SO_2 + O_2$ |

[a]Corrected to a productivity of 5,000 g polymer per g catalyst to afford a true comparison.
[b]Ratio of high load melt index to melt index.

Catalyst 1 is the control for invention Catalyst 2 and Catalyst 3 is the control for invention Catalyst 4.

Inspection of the data indicates that catalysts activated in a $SO_2$—$O_2$ environment have substantially greater melt index capability in ethylene particle form polymerization than otherwise similar catalysts activated in an environment consisting of oxygen which may be admixed with inert diluent or diluent mixtures such as nitrogen, argon, and the like. The improved results were obtained even though total hold times during activation were less than those employed for the control Catalysts 1 and 3.

Catalysts 1 and 2 were activated at 1200° F. and Catalysts 3 and 4 at 1400° F. Thus, the effect of increasing catalyst activating temperature is reflected in increasing melt index of polymers made over the catalysts whether they are activated conventionally or in an $SO_2$—$O_2$ environment.

The high load melt index to melt index ratios displayed are related to the shear response of the polymers; the higher the value, the greater the shear response. The listed values are representative of polymers having relatively low shear response. Such polymers are usefully employed in blow molding and extrusion applications, e.g., bottles, film, etc.

We claim:
1. A method for producing an activated catalyst said method comprising:
  (1) contacting a catalyst comprising chromium on a silica-containing support with a gaseous environment consisting essentially of sulfur dioxide and oxygen at a temperature within a temperature range and for a time sufficient to activate the catalyst and subsequently

(2) maintaining a temperature within the contact temperature range of step (1) while contacting said catalyst with a gaseous environment consisting essentially of oxygen and gases inert to reaction with the catalyst.

2. A method of claim 1 wherein the catalyst is contacted with a gaseous environment consisting essentially of oxygen and gases inert to reaction with the catalyst while the temperature is being increased prior to contact with sulfur dioxide.

3. A method of claim 1 wherein the catalyst is contacted with a gaseous environment consisting essentially of sulfur dioxide and oxygen while the temperature is being increased to the activation range.

4. A method of claim 1, 2 or 3 wherein the temperature for step (b) is not raised above that attained in step (a).

5. A method of claim 1, 2 or 3 wherein the mole ratio of sulfur dioxide:oxygen is in the range of about 1:0.55 to about 1:10.

6. A method of claim 1, 2 or 3 wherein said gaseous environment consisting essentially of sulfur dioxide and oxygen is within a temperature range of about 450° to about 1100° C. (840° to 2000° F.), the contact time between the gaseous environment of sulfur dioxide and oxygen is in the range of about 1 to about 5 hours, and the total contact time between catalyst and gaseous environment is in the range of about 2 to about 20 hours.

7. A method of claim 6 wherein the contact between the catalyst and the gaseous environment of sulfur dioxide and oxygen is within a temperature range of about 540° to about 900° C. (1000°–1650° F.).

8. An activated catalyst produced by the method of claims 1, 2, 3 or 6.

* * * * *